US011097839B2

(12) United States Patent
Sinha et al.

(10) Patent No.: US 11,097,839 B2
(45) Date of Patent: Aug. 24, 2021

(54) HYBRID POWER SYSTEMS FOR DIFFERENT MODES OF FLIGHT

(71) Applicant: Kitty Hawk Corporation, Palo Alto, CA (US)

(72) Inventors: Pranay Sinha, Sunnyvale, CA (US); Damon Vander Lind, Alameda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 17/066,050

(22) Filed: Oct. 8, 2020

(65) Prior Publication Data

US 2021/0107667 A1    Apr. 15, 2021

Related U.S. Application Data

(60) Provisional application No. 62/912,872, filed on Oct. 9, 2019.

(51) Int. Cl.
*B64D 31/06* (2006.01)
*B64C 29/00* (2006.01)
(Continued)

(52) U.S. Cl.
CPC .......... *B64C 29/0033* (2013.01); *B60L 50/64* (2019.02); *B60L 53/00* (2019.02);
(Continued)

(58) Field of Classification Search
CPC ........ B64D 31/06; B64D 27/24; B64D 27/02; B64D 2027/026; B64D 2221/00;
(Continued)

(56) References Cited

U.S. PATENT DOCUMENTS 1,868,832 A * 7/1932 Henter .................. B64C 23/005
244/209
2,415,710 A * 2/1947 Smith .................. B64C 23/005
244/113
(Continued)

FOREIGN PATENT DOCUMENTS

CN         106170902        8/2018
JP         H11332023        11/1999
(Continued)

OTHER PUBLICATIONS

Author Unknown, Aerial Ridesharing at Scale, Uber Elevate, Oct. 3, 2019, Retrieved from http://web.archive.org/web/20191003070118/https://www.uber.com/us/en/elevate/uberair/.
(Continued)

*Primary Examiner* — Medhat Badawi
(74) *Attorney, Agent, or Firm* — Van Pelt, Yi & James LLP

(57) ABSTRACT

A first power source, a second power source, and a power controller are provided, where a vehicle that includes the first power source, the second power source, and the power controller is capable of flying in a transitional mode between a hovering mode and a forward flight mode. The power controller selects one or more of the first power source and the second power source to power a rotor included in the vehicle during the transitional mode.

20 Claims, 11 Drawing Sheets

(51) Int. Cl.
| | |
|---|---|
| *G05D 1/10* | (2006.01) |
| *B64C 13/48* | (2006.01) |
| *B64C 39/12* | (2006.01) |
| *B64D 27/24* | (2006.01) |
| *B64D 27/26* | (2006.01) |
| *B60L 53/00* | (2019.01) |
| *B60L 50/64* | (2019.01) |
| *B64C 27/82* | (2006.01) |
| *B64D 27/02* | (2006.01) |

(52) U.S. Cl.
CPC .............. *B64C 13/48* (2013.01); *B64C 27/82* (2013.01); *B64C 39/12* (2013.01); *B64D 27/02* (2013.01); *B64D 27/24* (2013.01); *B64D 27/26* (2013.01); *B64D 31/06* (2013.01); *G05D 1/101* (2013.01); *B60L 2200/10* (2013.01); *B64C 2027/8209* (2013.01); *B64D 2027/026* (2013.01); *B64D 2027/264* (2013.01)

(58) Field of Classification Search
CPC ................ B64C 29/0033; B64C 27/82; B64C 2027/8209; B60L 53/00; B60L 50/64; B60L 2200/10; H01M 2220/20
See application file for complete search history.

(56) References Cited

U.S. PATENT DOCUMENTS

| | | | | |
|---|---|---|---|---|
| 2,937,823 | A * | 5/1960 | Fletcher | B64C 29/0033 244/12.6 |
| 3,081,964 | A * | 3/1963 | Quenzler | B64C 29/0033 244/7 R |
| 3,089,666 | A * | 5/1963 | Quenzler | B64C 9/24 244/7 R |
| 3,115,317 | A * | 12/1963 | Merrick | B64C 23/005 244/12.4 |
| 3,121,544 | A * | 2/1964 | Alvarez-Calderon | B64C 23/08 244/10 |
| 3,159,361 | A * | 12/1964 | Weiland | B60V 1/14 244/12.1 |
| 3,179,354 | A * | 4/1965 | Alvarez-Calderon | B64C 23/00 244/12.4 |
| 3,203,649 | A * | 8/1965 | Girard | B64C 23/005 244/201 |
| 3,273,827 | A * | 9/1966 | Girard | B64C 29/0033 244/201 |
| 3,284,027 | A * | 11/1966 | Mesniere | B64C 29/0033 244/12.4 |
| 3,666,209 | A * | 5/1972 | Taylor | B64C 29/0033 244/7 C |
| 3,949,957 | A * | 4/1976 | Portier | B64C 9/26 244/210 |
| 4,025,860 | A | 5/1977 | Shibata | |
| 4,080,922 | A * | 3/1978 | Brubaker | B64C 35/00 114/282 |
| 4,613,098 | A * | 9/1986 | Eickmann | B64C 39/00 244/46 |
| 4,746,081 | A * | 5/1988 | Mazzoni | B64C 39/12 244/89 |
| 4,930,725 | A * | 6/1990 | Thompson | F02C 7/12 244/53 R |
| 4,979,698 | A * | 12/1990 | Lederman | B64C 29/0033 244/17.13 |
| 5,195,702 | A * | 3/1993 | Malvestuto, Jr. | B64C 23/02 244/215 |
| 5,244,167 | A * | 9/1993 | Turk | B64C 9/38 244/12.1 |
| 5,454,531 | A * | 10/1995 | Melkuti | B64C 29/0025 244/12.6 |
| 6,561,456 | B1 * | 5/2003 | Devine | B64C 29/0025 244/12.1 |
| 6,732,972 | B2 * | 5/2004 | Malvestuto, Jr. | B64C 23/08 244/12.3 |
| 8,128,019 | B2 * | 3/2012 | Annati | B64C 39/024 244/23 A |
| 8,552,575 | B2 * | 10/2013 | Teets | H04W 64/00 290/40 C |
| 9,356,470 | B2 * | 5/2016 | Yamamoto | H02J 9/04 |
| 9,694,906 | B1 * | 7/2017 | Sadek | B64C 39/024 |
| 9,957,042 | B1 * | 5/2018 | Vander Lind | B64C 11/28 |
| 9,975,631 | B1 * | 5/2018 | McLaren | B64C 27/28 |
| 10,144,503 | B1 * | 12/2018 | Vander Lind | B64C 29/0025 |
| 10,153,636 | B1 * | 12/2018 | Vander Lind | H02J 1/10 |
| 10,710,741 | B2 * | 7/2020 | Miki | G01P 5/00 |
| D892,710 | S * | 8/2020 | Vander Lind | D12/344 |
| 10,773,799 | B1 * | 9/2020 | Thrun | B64D 1/12 |
| 10,778,024 | B2 | 9/2020 | Gu | |
| 10,843,807 | B2 * | 11/2020 | Bevirt | B64D 31/06 |
| 10,845,823 | B2 * | 11/2020 | Burghardt | G01C 21/165 |
| 2003/0094537 | A1 * | 5/2003 | Austen-Brown | B64C 29/0033 244/7 R |
| 2004/0201365 | A1 * | 10/2004 | Dasgupta | H02J 7/34 320/116 |
| 2005/0133662 | A1 * | 6/2005 | Magre | B64C 29/0033 244/7 R |
| 2006/0118675 | A1 * | 6/2006 | Tidwell | B64C 3/40 244/123.1 |
| 2006/0144992 | A1 * | 7/2006 | Jha | B64C 3/40 244/46 |
| 2006/0216585 | A1 * | 9/2006 | Lee | H01M 2/30 429/162 |
| 2010/0051753 | A1 * | 3/2010 | Yoeli | B64C 29/0025 244/23 A |
| 2011/0001020 | A1 * | 1/2011 | Forgac | B64C 39/024 244/7 A |
| 2011/0155859 | A1 * | 6/2011 | Vetters | B64C 29/0025 244/23 A |
| 2011/0168835 | A1 * | 7/2011 | Oliver | B64D 27/12 244/12.4 |
| 2011/0185736 | A1 * | 8/2011 | McKinney | F23R 3/06 60/752 |
| 2011/0260544 | A1 * | 10/2011 | Imai | H02J 7/1423 307/66 |
| 2011/0267241 | A1 * | 11/2011 | Grimm | H02S 10/12 343/706 |
| 2012/0209456 | A1 * | 8/2012 | Harmon | B64D 35/08 701/3 |
| 2012/0235473 | A1 | 9/2012 | Jiang | |
| 2012/0286102 | A1 * | 11/2012 | Sinha | B64C 29/0025 244/7 B |
| 2013/0147276 | A1 * | 6/2013 | Yamamoto | H02J 3/387 307/64 |
| 2013/0221154 | A1 * | 8/2013 | Vander Lind | B64C 31/06 244/54 |
| 2014/0011076 | A1 * | 1/2014 | Kanemoto | H01M 2/1673 429/163 |
| 2014/0111121 | A1 | 4/2014 | Wu | |
| 2014/0151495 | A1 | 6/2014 | Kuhn, Jr. | |
| 2014/0158816 | A1 * | 6/2014 | DeLorean | B64C 27/32 244/12.4 |
| 2014/0186659 | A1 * | 7/2014 | Dhar | B60L 50/16 429/9 |
| 2014/0265554 | A1 * | 9/2014 | Yang | B60L 58/26 307/9.1 |
| 2015/0028151 | A1 * | 1/2015 | Bevirt | B64D 27/24 244/6 |
| 2015/0136897 | A1 * | 5/2015 | Seibel | B64C 29/0033 244/6 |
| 2015/0202984 | A1 * | 7/2015 | Wyatt | H01M 10/052 320/109 |
| 2015/0232178 | A1 * | 8/2015 | Reiter | B64C 3/385 244/7 A |
| 2015/0266571 | A1 * | 9/2015 | Bevirt | B64C 29/0033 244/7 C |

(56) References Cited

U.S. PATENT DOCUMENTS

| | | | | |
|---|---|---|---|---|
| 2015/0344134 | A1* | 12/2015 | Cruz Ayoroa | B64C 39/12 244/48 |
| 2015/0354453 | A1* | 12/2015 | Hanrahan | F02C 7/05 60/772 |
| 2016/0072107 | A1* | 3/2016 | Farha | B60L 50/15 318/139 |
| 2016/0101853 | A1* | 4/2016 | Toppenberg | B64C 29/0033 244/7 A |
| 2016/0214712 | A1* | 7/2016 | Fisher | B64C 29/00 |
| 2016/0221683 | A1* | 8/2016 | Roberts | B64D 27/02 |
| 2016/0288903 | A1* | 10/2016 | Rothhaar | B64C 29/0033 |
| 2016/0340035 | A1* | 11/2016 | Duru | B64D 31/04 |
| 2016/0380315 | A1* | 12/2016 | Weicker | H02J 1/10 320/136 |
| 2017/0008627 | A1* | 1/2017 | de Soto | B64D 27/04 |
| 2017/0012445 | A1 | 1/2017 | Takemura | |
| 2017/0036760 | A1* | 2/2017 | Stan | B64C 29/0033 |
| 2017/0057650 | A1* | 3/2017 | Walter-Robinson | B64D 41/00 |
| 2017/0072812 | A1* | 3/2017 | Von Novak | H02J 1/10 |
| 2017/0197700 | A1* | 7/2017 | Wainfan | B64D 27/24 |
| 2017/0203839 | A1* | 7/2017 | Giannini | B64C 5/16 |
| 2017/0203850 | A1* | 7/2017 | Wang | H02M 3/156 |
| 2017/0225573 | A1 | 8/2017 | Waltner | |
| 2017/0240291 | A1* | 8/2017 | Kim | B64D 33/08 |
| 2018/0002011 | A1* | 1/2018 | McCullough | B64C 11/28 |
| 2018/0002012 | A1* | 1/2018 | McCullough | B64D 25/12 |
| 2018/0029693 | A1* | 2/2018 | Vander Lind | B64C 11/46 |
| 2018/0086447 | A1* | 3/2018 | Winston | B64D 27/12 |
| 2018/0265193 | A1* | 9/2018 | Gibboney | B64C 39/08 |
| 2019/0100322 | A1 | 4/2019 | Schank | |
| 2019/0112028 | A1* | 4/2019 | Williams | B64C 3/32 |
| 2019/0118943 | A1 | 4/2019 | Machin | |
| 2019/0135425 | A1* | 5/2019 | Moore | B64C 3/10 |
| 2019/0329863 | A1* | 10/2019 | King | B64D 27/12 |
| 2019/0352002 | A1* | 11/2019 | Schulte | B64D 45/00 |
| 2020/0130858 | A1* | 4/2020 | Julien | F01P 3/00 |
| 2020/0272141 | A1* | 8/2020 | Chung | B64C 29/0033 |

FOREIGN PATENT DOCUMENTS

| | | |
|---|---|---|
| JP | 2004111242 | 4/2004 |
| JP | 2006121874 | 5/2006 |
| JP | 2008260346 | 10/2008 |
| JP | 2015050041 | 3/2015 |
| KR | 20160051690 | 5/2016 |
| WO | 2013090080 | 6/2013 |
| WO | 2014199942 | 12/2014 |
| WO | 2015137222 | 9/2015 |
| WO | 2017113338 | 7/2017 |

OTHER PUBLICATIONS

International Application No. PCT/US17/34950 International Search Report and Written Opinion, dated Aug. 17, 2017.

Mark Moore, Vehicle Collaboration Strategy and Common Reference Models, Uber Elevate Transformative VTOL Workshop, Jan. 2018.

* cited by examiner

HYBRID POWER SYSTEMS FOR DIFFERENT MODES OF FLIGHT

CROSS REFERENCE TO OTHER APPLICATIONS

This application claims priority to U.S. Provisional Patent Application No. 62/912,872 entitled FIXED WING AIRCRAFT WITH TILT ROTORS filed Oct. 9, 2019 which is incorporated herein by reference for all purposes.

BACKGROUND OF THE INVENTION

New types of aircraft are being developed which are capable of taking off and landing in dense urban areas, opening up new transportation pathways and bypassing gridlock on the roads. For example, Kitty Hawk Corporation is developing a new electric vertical takeoff and landing (eVTOL) tiltrotor which can take off and land in a footprint of roughly 30 ft.×30 ft. An early prototype has been manufactured and tested and further improvements to the vehicle's performance (e.g., improving the range) would be desirable.

BRIEF DESCRIPTION OF THE DRAWINGS

Various embodiments of the invention are disclosed in the following detailed description and the accompanying drawings.

FIG. 2B is a diagram illustrating a bottom view of an embodiment of boundary layer thicknesses with motors on.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of an electric vertical takeoff and landing (eVTOL) tiltrotor with a hybrid power system are described herein. For context and background, it may be helpful to first describe an earlier version of the vehicle which used a single type of cell and/or power train across all power systems (e.g., all batteries have the same design with the same type of cell). Then, various embodiments of the exemplary eVTOL tiltrotor with hybrid power systems and example applications and/or benefits are described. Naturally, the hybrid power systems described herein may be used in other vehicles.

Figure 1A:
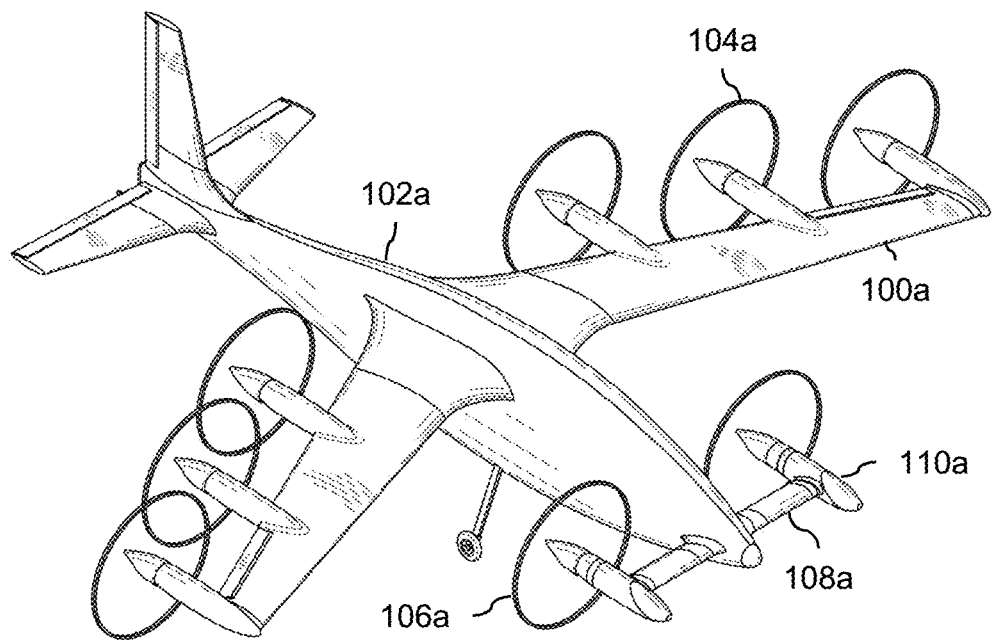
FIG. 1A is a perspective view diagram illustrating an embodiment of a forward swept, fixed wing vehicle with tilt rotors.
Figure 1B:
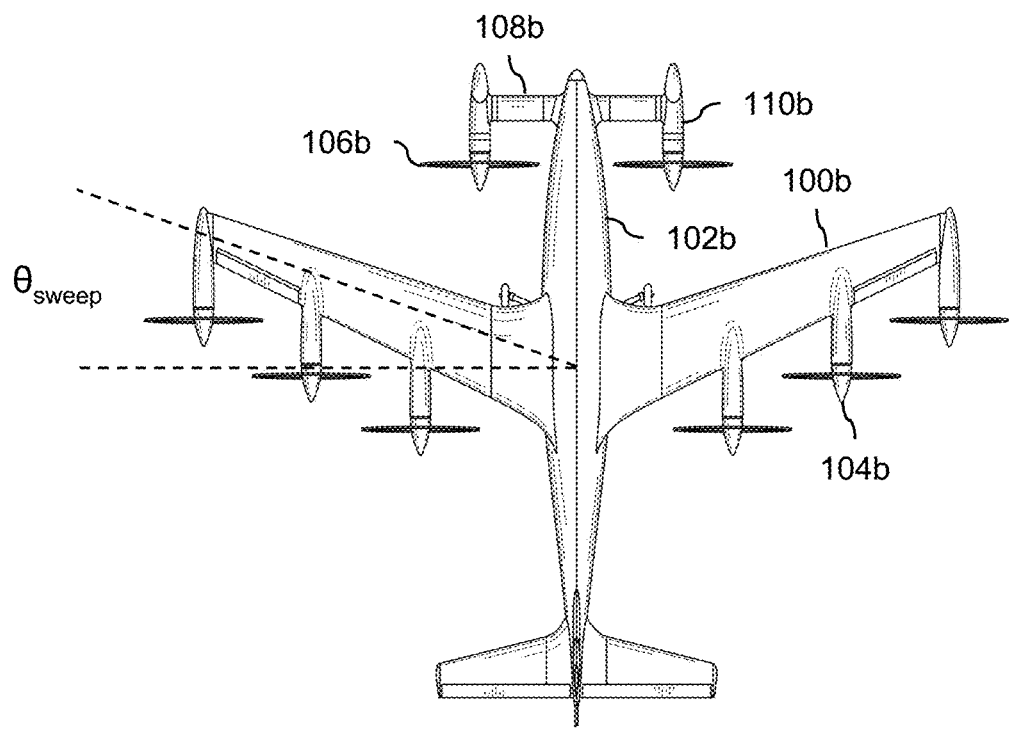
FIG. 1B is a top view diagram illustrating an embodiment of a forward swept, fixed wing vehicle with tilt rotors.

FIG. 1A is a perspective view diagram illustrating an embodiment of a forward swept, fixed wing vehicle with tilt rotors. FIG. 1B is a top view diagram illustrating an embodiment of a forward swept, fixed wing vehicle with tilt rotors. In the example shown, the main wing (100a and 100b) is a fixed wing which is attached to the fuselage (102a and 102b) in a fixed manner or position. The main wing is not, in other words, a tilt wing which is capable of rotating. The main wing (100a and 100b) is also forward swept (e.g., relative to the pitch axis). For example, the forward-sweep angle may be on the order of $\theta_{sweep}$ between 14° and 16° for aircraft embodiments with a canard (as shown here) or as high as 35° for aircraft embodiments without a canard.

In this example, the main wing (100a and 100b) has six rotors (104a and 104b) which are attached to the trailing edge of the main wing. Rotors or propellers in this configuration are sometimes referred to as pusher propellers (e.g., because the propellers are behind the wing and "push" the vehicle forward, at least when they are in their forward flight position). Forward flight mode is sometimes referred to herein as cruise mode. For clarity, these rotors on the main wing are sometimes referred to as the main wing rotors (e.g., to differentiate them from the rotors which are attached to the canard). Naturally, the number of rotors shown here is merely exemplary and is not intended to be limiting.

In addition to the six main wing rotors, there are two rotors (106a and 106b) which are attached to the canard (108a and 108b). These rotors are sometimes referred to as the canard rotors. The canard is thinner than the main wing, so unlike the main wing rotors, the canard rotors are attached to the distal ends of the canard as opposed to the trailing edge of the canard.

All of the rotors in this example are tilt rotors, meaning that they are capable of tilting or otherwise rotating between two positions. In the drawings shown here, the rotors are in a cruise (e.g., forward flight, backward facing, etc.) position. In this position, the rotors are rotating about the (e.g., substantially) longitudinal axes of rotation so that they provide (substantially) backward thrust. When the rotors are in this position, the lift to keep the tiltrotor vehicle airborne comes from the airflow over the main wing (100a and 100b) and the canard (108a and 108b). In this particular example, the rotational range of a tilt rotor ranges has a minimum angular position of approximately 0°-5° and a maximum angular position of approximately 90°-95°. This range is design and/or implementation specific.

The rotors can also be tilted down to be in a hover (e.g., vertical takeoff and landing, downward facing, etc.) position (not shown). In this second position, the rotors are rotating about (e.g., substantially) vertical axes of rotation so that they provide (substantially) downward thrust. In this configuration, the lift to keep the tiltrotor vehicle airborne comes from the downward airflow of the rotors.

Generally speaking, the tilt rotors, when oriented to output thrust substantially downward, permit the aircraft to perform vertical takeoff and landings (VTOL). This mode or configuration (e.g., with respect to the manner in which the aircraft as a whole is flown and/or with respect to the position of the tilt rotors specifically) is sometimes referred to as hovering. The ability to perform vertical takeoffs and landings permits the aircraft to take off and land in areas where there are no airports and/or runways. Once airborne, the tilt rotors (if desired) change position to output thrust (substantially) backwards instead of downwards. This permits the aircraft to fly in a manner that is more efficient for forward flight; this mode or configuration is sometimes referred to as cruising.

A canard is useful because it can stall first (e.g., before the main wing), creating a lot of pitching moments and not much loss of lift at stall whereas a main wing stall loses a lot of lift per change in pitching moment (e.g., causing the entire aircraft to drop or fall). Stalls are thus potentially more benign with a canard compared to without a canard. The canard stall behavior is particularly beneficial in combination with a swept forward wing, as the stall of the main wing can create an adverse pitching moment if at the wing root and can create large and dangerous rolling moments if at the wing tip. Furthermore, a canard can create lift at low airspeeds and increase $CL_{max}$ (i.e., maximum lift coefficient) and provides a strut to hold or otherwise attach the canard motors to.

In some embodiments, the pylons (110a and 110b) which are used to attach the rotors to the canard and/or main wing include some hinge and/or rotating mechanism so that the tilt rotors can rotate between the two positions shown. Any appropriate hinge mechanism may be used. For example, with ultralight aircraft, there are very stringent weight requirements and so a lightweight solution may be desirable. Alternatively, a fixed-tilt solution may also be used to meet very stringent weight requirements.

In some embodiments, the aircraft is designed so that the main wing (100a and 100b) and canard (108a and 108b) are able to provide sufficient lift to perform a glider-like landing if needed during an emergency. For example, some ultralight standards or specifications require the ability to land safely if one or more rotors fail and the ability to perform a glider-like landing would satisfy that requirement. One benefit to using a fixed wing for the main wing (e.g., as opposed to a tilt wing) is that there is no danger of the wing being stuck in the wrong position (e.g., a hover position) where a glider-like landing is not possible because of the wing position which is unsuitable for a glider-like landing.

Another benefit to a fixed wing with trailing edge mounted tilt rotors is stall behavior (or lack thereof) during a transition from hover position to cruise position or vice versa. With a tilt wing, during transition, the tilt wing's angle of attack changes which makes stalling an increased risk. A fixed wing with trailing edge mounted tilt rotors does not change the wing angle of attack (e.g., even if rotors are turned off/on or the tilt rotors are shifted). Also, this configuration both adds dynamic pressure and circulation over the main wing, which substantially improves the behavior during a transition (e.g., from hover position to cruise position or vice versa). In other words, the transition can be performed faster and/or more efficiently with a fixed wing with trailing edge mounted tilt rotors compared to a tilt wing (as an example).

Another benefit associated with a fixed wing vehicle with tilt rotors (e.g., as opposed to a tilt wing) is that a smaller mass fraction is used for the tilt actuator(s). That is, multiple actuators for multiple tilt rotors (still) comprise a smaller mass fraction than a single, heavy actuator for a tilt wing. There are also fewer points of failure with tilt rotors since there are multiple actuators as opposed to a single (and heavy) actuator for the tilt wing. Another benefit is that a fixed wing makes the transition (e.g., between a cruising mode or position and a hovering mode or position) more stable and/or faster compared to a tilt wing design.

In some embodiments, the rotors are variable pitch propellers which have different blade pitches when the rotors are in the hovering position versus the cruising position. For example, different (ranges of) blade pitches may enable more efficient operation or flight when in the cruise position versus the hovering position. When the rotors are in a cruise position, putting the blade pitches into "cruising pitch" (e.g., on the order of 26°) enables low frontal area which is good for cruising (e.g., lower drag). When the rotors are in a hovering position, putting the blade pitches into a "hovering pitch" (e.g., on the order of 6°) enables high disc area which is good for hovering. To put it another way, one blade pitch may be well suited for cruising mode but not for hovering mode and vice versa. The use of variable pitch propellers enables better (e.g., overall) efficiency, resulting in less power consumption and/or increased flight range.

The following figures illustrate various benefits associated with the exemplary aircraft shown in FIGS. 1A and 1B.

Figure 2B:
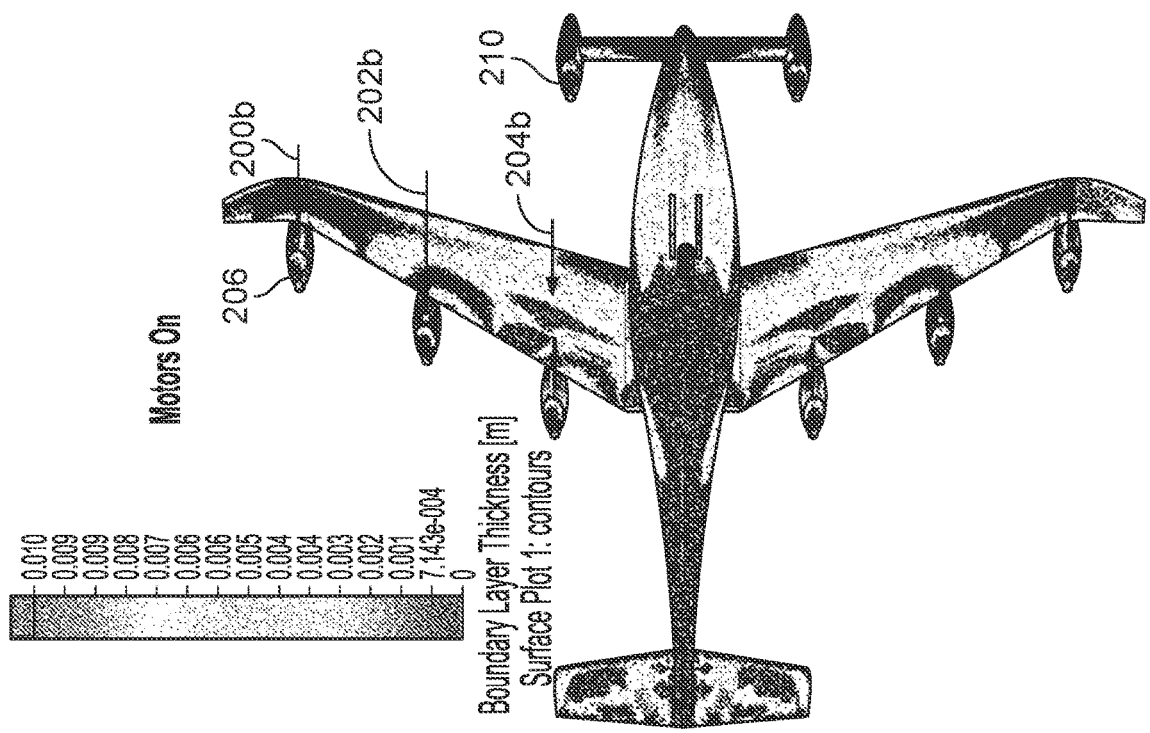
Figure 2A:
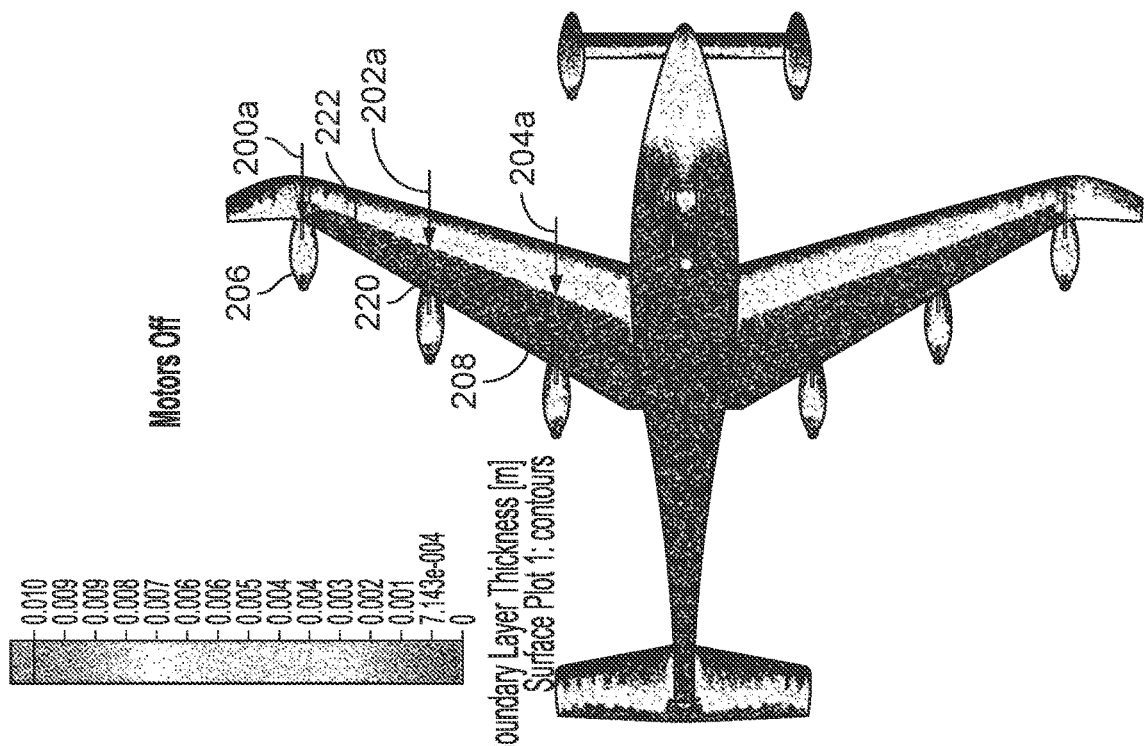
FIG. 2A is a diagram illustrating a bottom view of an embodiment of boundary layer thicknesses with the motors off.

FIG. 2A is a diagram illustrating a bottom view of an embodiment of boundary layer thicknesses with the motors off. In this example, laminar run lines 200a, 202a, and 204a illustrate laminar runs at various regions of the main wing. In this example, it is assumed that the aircraft is cruising (e.g., flying in a substantially forward direction). As in FIGS. 1A and 1B, the main wing rotors (206) are attached to the trailing edge of the main wing (208) in this embodiment. The next figure shows the boundary layer thicknesses with the rotors turned on.

FIG. 2B is a diagram illustrating a bottom view of an embodiment of boundary layer thicknesses with motors on. In this example, the motors are on and the rotors have an exit airflow velocity of 30 m/s. With the motors on, a low pressure region is created towards the aft of the wing which increases the laminar run on the main wing. See, for example, laminar run lines 200b, 202b, and 204b which correspond to laminar run lines 200a, 202a, and 204a from FIG. 2A. A comparison of the two sets illustrates that the laminar runs have increased for the first two locations (i.e., at 200a/200b and 202a/202b). The last location (i.e., 204a/204b) has only a slightly longer laminar run length due to interference from the canard rotors (210).

The drag from the main wing rotors (more specifically, the drag from the pylons which are used to attach the main wing rotors to the main wing) is hidden in the wake of the airflow coming off the main wing. See, for example FIG. 2A which more clearly shows that the pylons (220) are connected or otherwise attached behind most of the extent of laminar run (222). With the embodiment shown here, the pylons also get to keep some of the boundary layer thickness from the main wing, which means the pylons have lower drag per surface area. This improves the drag compared to some other alternate designs or configurations. The following figures describe this in more detail.

Figure 3A:
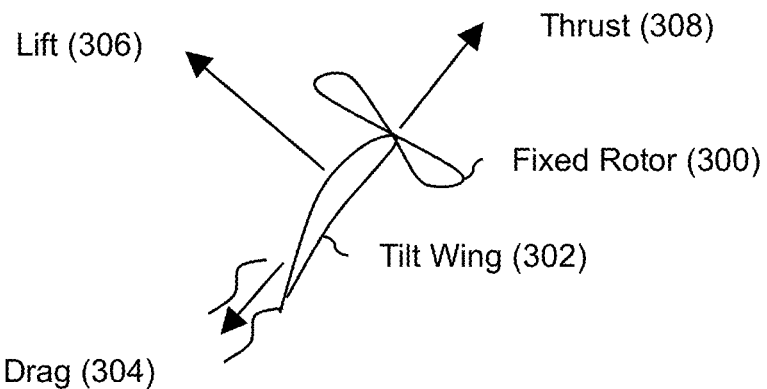
FIG. 3A is a diagram illustrating an example of a tilt wing configuration with corresponding lift vector, thrust vector, and drag.

FIG. 3A is a diagram illustrating an example of a tilt wing configuration with corresponding lift vector, thrust vector, and drag. In this example, a fixed rotor (300) is attached to a tilt wing (302) at a fixed position or angle. This is one alternate arrangement to the aircraft embodiment(s) described above. To direct the airflow produced by the fixed rotor (300) either backwards or downwards, the tilt wing (302) is rotated. As shown here, with this configuration, there is drag (304) at the trailing edge of the tilt wing, which is undesirable.

The lift (306) and thrust (308) for this configuration are also shown here, where the tilt wing is shown in the middle of a transition (e.g., between a cruising position and a hovering position). As shown here, the lift (306) and thrust (308) are substantially orthogonal to each other, which is inefficient. In other words, a tilt wing is inefficient during its transition.

Figure 3B:
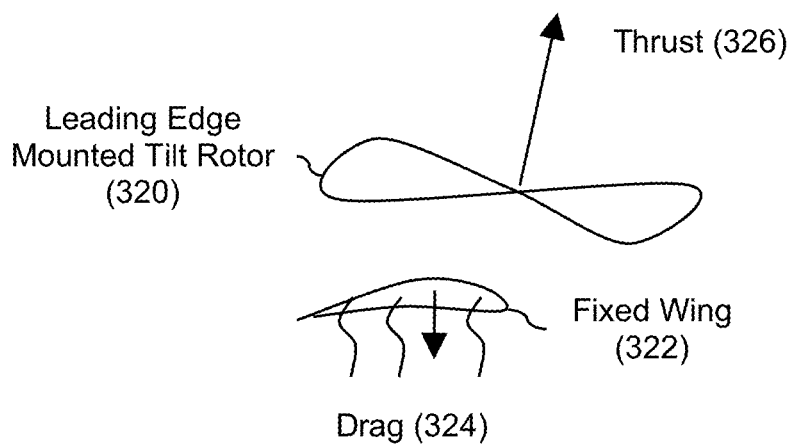
FIG. 3B is a diagram illustrating an example of a fixed wing configuration with a leading edge mounted tilt rotor and corresponding lift vector, thrust vector, and drag.

FIG. 3B is a diagram illustrating an example of a fixed wing configuration with a leading edge mounted tilt rotor and corresponding lift vector, thrust vector, and drag. In this example, a tilt rotor (320) is attached to the leading edge of a fixed wing (322). This is another alternate arrangement to the aircraft embodiment(s) described above. The corresponding drag (324) and thrust (326) for this arrangement are also shown. There is no useful lift produced with this configuration and therefore no lift vector is shown here.

Figure 3C:
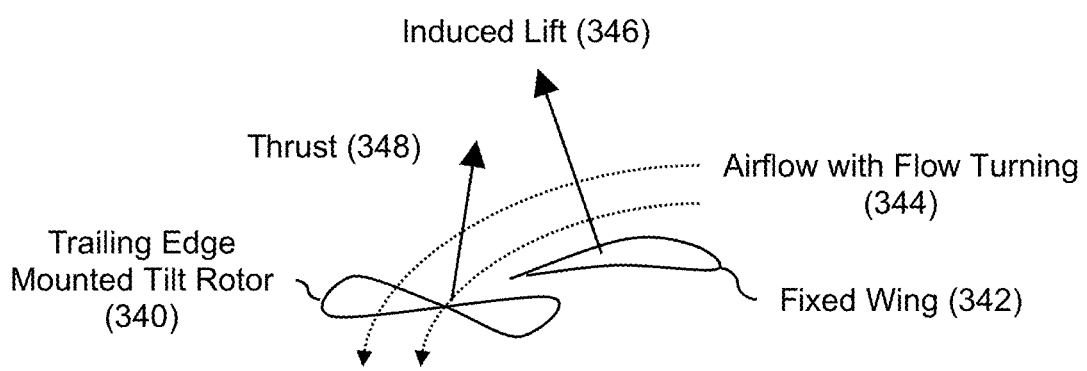
FIG. 3C is a diagram illustrating an embodiment of a fixed wing configuration with a trailing edge mounted tilt rotor and corresponding lift vector, thrust vector, and drag.

FIG. 3C is a diagram illustrating an embodiment of a fixed wing configuration with a trailing edge mounted tilt rotor and corresponding lift vector, thrust vector, and drag. In this example, the tilt rotor (340) is attached to the trailing edge of the fixed wing (342). In this configuration, the drag due to the trailing edge mounted tilt rotor (e.g., mostly due to its pylon, not shown) is hidden in the wake of the airflow coming off the main wing. As such, there is no drag (at least due to the tilt rotor (340)).

The position of the trailing edge mounted tilt rotor (340) relative to the fixed wing (342) also sucks air (344) over the fixed wing, after which the air turns or bends through the rotor and downwards. This flow turning over the wing generates a relatively large induced lift (346) which is shown here. The thrust vector (348) due to the rotors is also shown here. It is noted that the induced lift (346) and thrust (348) are substantially in the same direction (i.e., both are pointing substantially upwards) which is a more efficient arrangement, including during a transition. In other words, using a fixed wing with trailing edge mounted tilt rotors produces less drag and improved efficiency during a transition (e.g., due to the lift and thrust vectors which now point in substantially the same direction) compared to other rotor and wing arrangements. Note for example, drag 304 and drag 324 in FIG. 3A and FIG. 3B, respectively, and the orthogonal positions of lift 306 and thrust 308 in FIG. 3A.

The following figure illustrates an embodiment of flow turning in more detail.

Figure 4:
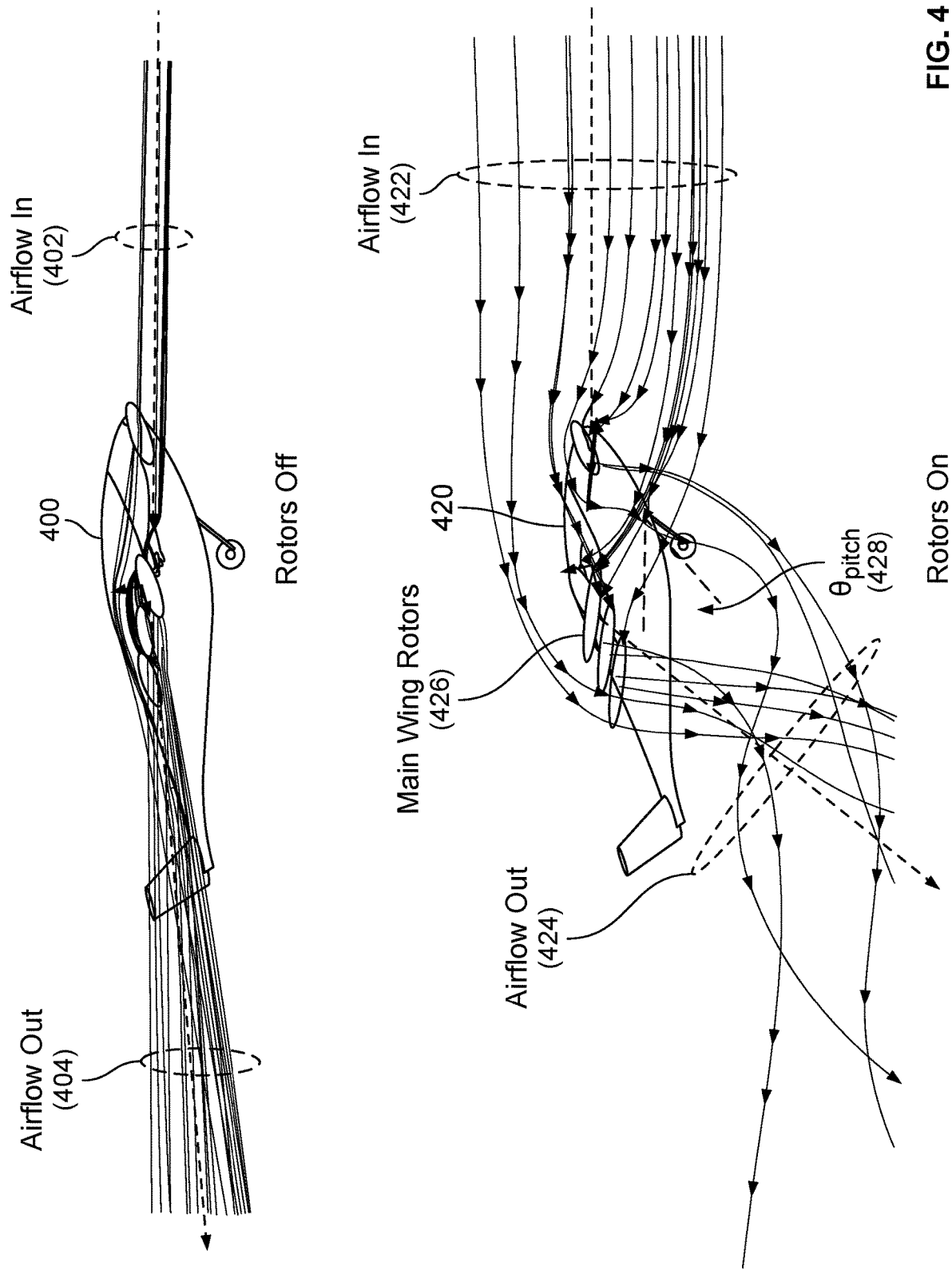
FIG. 4 is a diagram illustrating an embodiment of airflow produced when trailing edge mounted tilt rotors on a main wing are off.

FIG. 4 is a diagram illustrating an embodiment of airflow produced when trailing edge mounted tilt rotors on a main wing are off. In this example, a tiltrotor (400) is shown but with the main wing rotors turned off for comparison purposes. With the rotors off, the airflow in (402) and the airflow out (404) are moving in substantially the same direction. That is, the airflow does not turn (e.g., downwards) as it passes through the rotors.

Tiltrotor 420 shows the same vehicle as tiltrotor 400 except the rotors are turned on. In this example, the airflow in (422) and the airflow out (424) have noticeable different directions and there is noticeable turning or bending of the airflow as it passes through the rotors of the exemplary tiltrotor shown. As described above, this induces a noticeable lift, which is desirable because less power is consumed and/or the range of the tiltrotor increases.

In this example, the main wing rotors (426) are in the hovering position. As shown here, these rotors are slightly pitched or otherwise angled (e.g., with the tops of the main wing rotors pointing slightly forward and the bottoms pointing slightly backward). In this diagram, the amount of tilting is shown as $\theta_{pitch}$ (428) and in some embodiments is on the order of 90° of rotational range or movement (e.g., ~3° up from horizontal when in a cruise position (e.g., for minimum drag) and ~93° degrees down from horizontal when in a hover position which produces a rotational range of ~96°). Although this angling or pitching of the rotors is not absolutely necessary for flow turning to occur, in some embodiments the main wing rotors are angled or otherwise pitched to some degree in order to increase or otherwise optimize the amount of flow turning. In some embodiments, the canard rotors are similarly pitched. It is noted that tiltrotor 420 is shown in a nose up position and therefore the vertical axis (e.g., relative to the tiltrotor) is not perpendicular to the ground and/or frame of reference.

In some embodiments, the rotors (e.g., the main wing rotors and/or canard rotors) are rolled or otherwise angled slightly outward, away from the fuselage, when the rotors are in hovering position. In some embodiments, this roll (e.g., outward) is on the order of 10° for greater yaw authority.

In some embodiments, the main wing is tapered (e.g., the wing narrows going outward towards the tip) in addition to being forward swept. The following figures describe various wing and/or tail embodiments.

Figure 5:
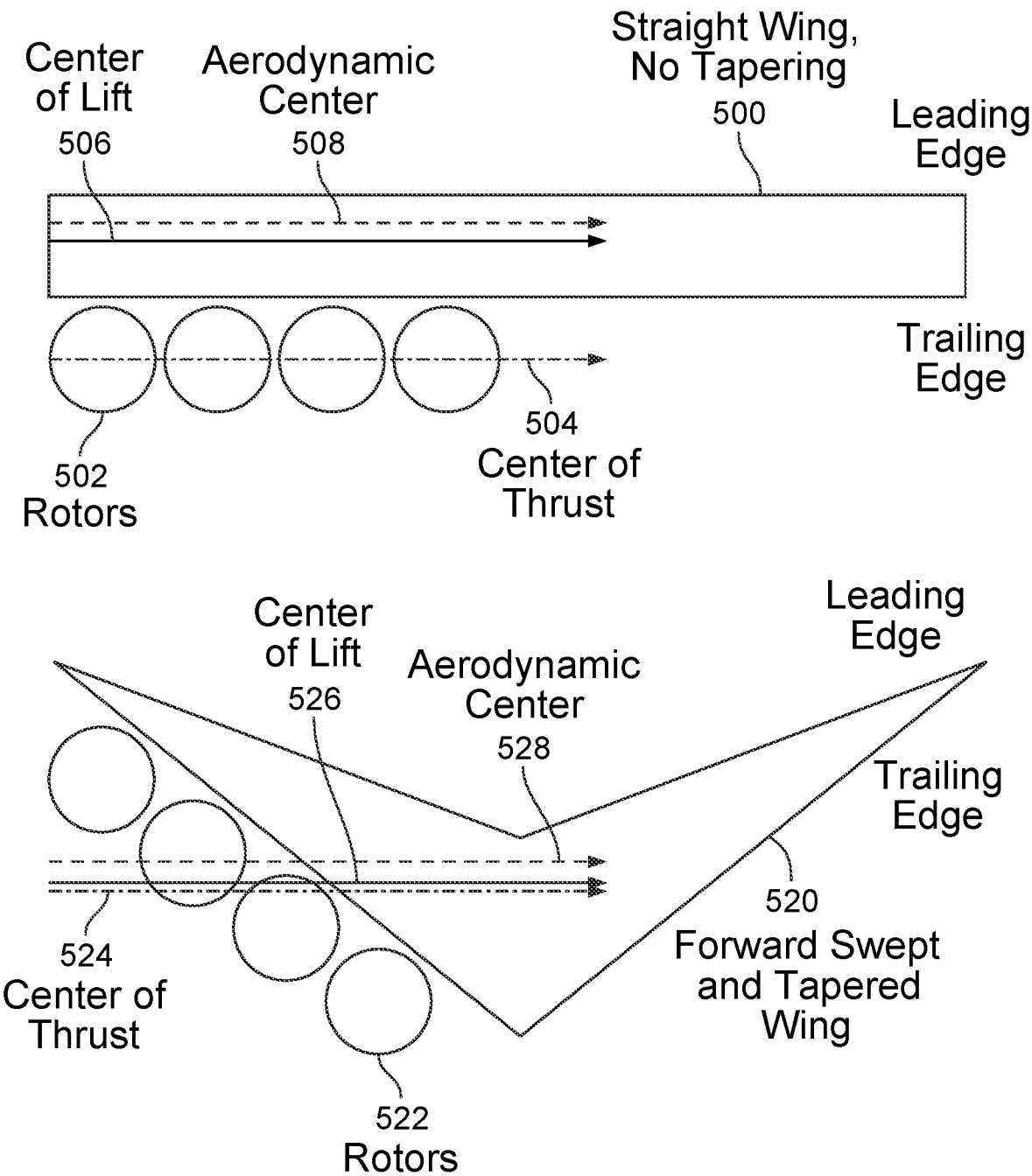
FIG. 5 is a diagram illustrating an embodiment of a forward swept and tapered wing and a straight wing for comparison.

FIG. 5 is a diagram illustrating an embodiment of a forward swept and tapered wing and a straight wing for comparison. In the example shown, wing 500 is a straight wing with no tapering (e.g., the wing is the same width from the center to the tip of the wing). Exemplary rotors (502) are shown at the trailing edge of the straight wing (500).

The center of thrust (504), indicated by a dashed and dotted line, is dictated by the placement or arrangement of the rotors and runs through the centers of the main wing rotors (502). For simplicity, the canard rotors are ignored in this example. The center of lift is based on the shape of the wing. For a rectangular wing such as wing 500, the center of lift (506), indicated by a solid line, runs down the center of the wing. Calculation of the aerodynamic center is more complicated (e.g., the aerodynamic center depends upon the cross section of the wing, etc.) and aerodynamic center 508, indicated by a dashed line, is exemplary and/or typical for this type of wing.

As shown here, the straight wing (500) and its corresponding arrangement of main wing rotors (502) produce a center of thrust (504) which is relatively far from both the center of lift (506) as well as the aerodynamic center. This separation is undesirable. More specifically, when the main wing rotors (502) are in hover position, if the center of thrust (504) is far from the center of lift (506), then the transition (e.g., in the context of the movement of the aircraft as a whole, such as switching from flying substantially upwards to substantially forwards or vice versa) would create very large moments and could overturn the vehicle or prevent acceleration or stability and/or require a massive and/or non-optimal propulsion system. In cruise, if the center of thrust (504) is far from the center of lift (506), it is not as important (e.g., since the thrust moments are both smaller and more easily balanced by aerodynamic moments), but it is still undesirable.

In contrast, the forward swept and tapered wing (520) and its corresponding arrangement of rotors (522) along the trailing edge produce a center of thrust (524), center of lift (526), and aerodynamic center (528) which are closer to each other. For example, the forward sweep of the wing brings the rotors forward to varying degrees. This causes the center of thrust to move forward (e.g., towards the leading edge and towards the other centers). The tapering of the wings prevents the aerodynamic center and center of lift from creeping forward too much (and more importantly, away from the center of thrust) as a result of the forward sweep. For example, with a forward swept wing with no tapering (not shown), the center of thrust would move forward approximately the same amount as the aerodynamic center and center of lift and would result in more separation between the three centers than is shown here with wing 520.

Some other benefits to a forward swept and tapered wing include better pilot visibility, and a better fuselage junction location with the main wing (e.g., so that the main wing spar can pass behind the pilot seat, not through the pilot). Furthermore, the taper reduces wing moments and puts the center of the thrust of the motors closer to the wing attachment to the fuselage, as referenced about the direction of flight, so there are less moments carried from wing to fuselage, a shorter tail boom (e.g., which reduces the weight of the aircraft), and improved pitch stability.

The following figures describe exemplary tilt transitions of the rotors between cruise position and hover position.

Figure 6A:
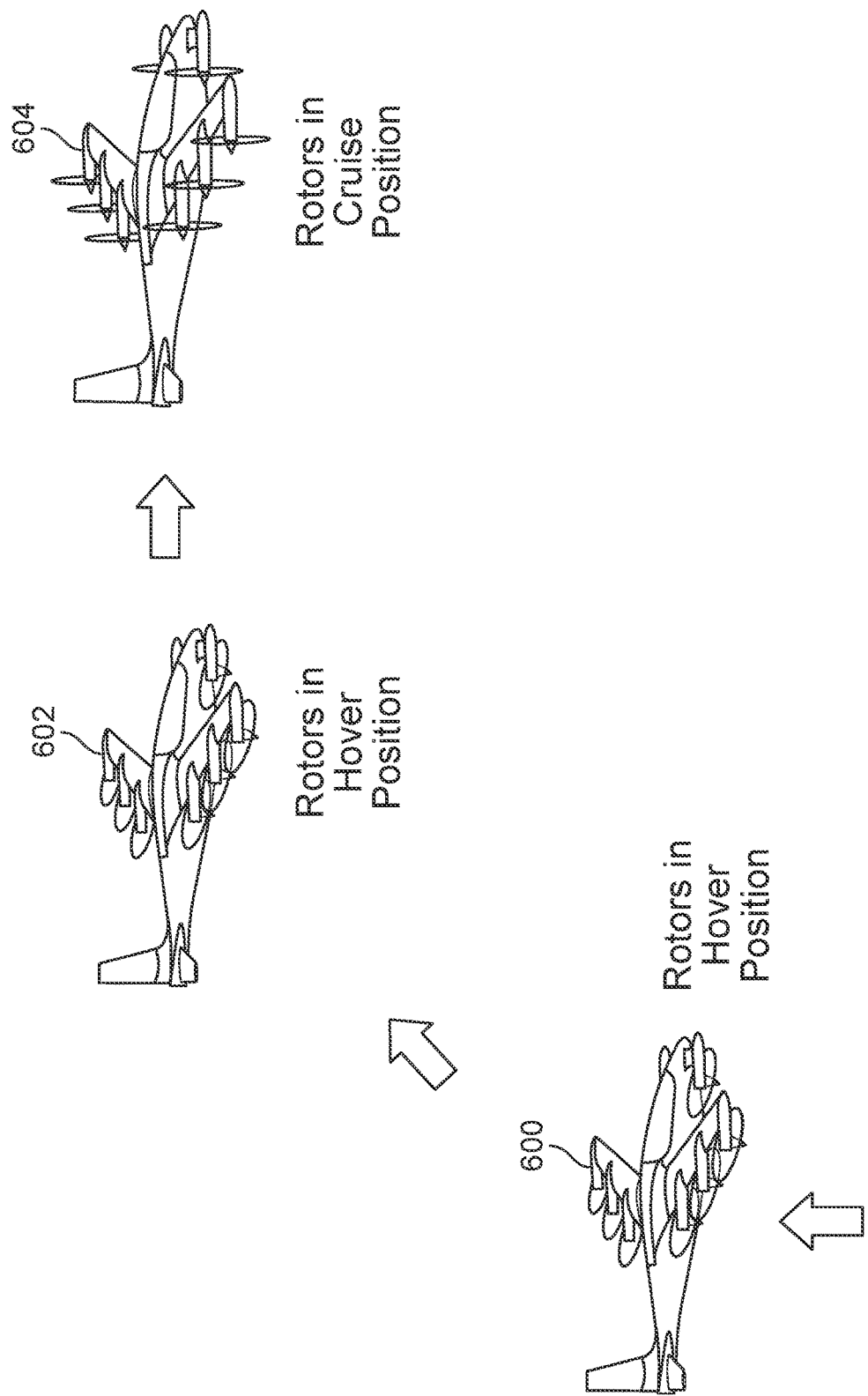
FIG. 6A is a diagram illustrating an embodiment of a takeoff tilt change from hover position to cruise position.

FIG. 6A is a diagram illustrating an embodiment of a takeoff tilt change from hover position to cruise position. In some embodiments, the exemplary tiltrotor performs this transition soon after taking off (e.g., substantially vertically).

It is noted that this tilt transition is optional and the aircraft may fly entirely with the rotors in the hovering position (albeit with less than optimal performance). For example, this could be done if there is risk in the tilting action, and it would be better to take the action at a higher altitude.

Tiltrotor 600 shows the exemplary aircraft after it has performed a vertical takeoff. In this state shown here, the main wing rotors and canard rotors are in hover position (e.g., rotating about a substantially vertical axis of rotation so that the rotors generate substantially downward thrust).

The tiltrotor then transitions from an entirely upward direction of movement to a direction of movement with at least some forward motion with the rotors remaining in the hover position until the tiltrotor reaches some desired altitude at which to begin the transition (602). In other words, the vehicle transitions first, and then changes the tilt of the rotors. In one example, the altitude at which the tiltrotor begins the rotor tilt change from hover position to cruise position is an altitude which is sufficiently high enough for there to be recovery time in case something goes wrong during the transition. Switching the rotors between hover position and cruise position is a riskier time where the likelihood of something going wrong (e.g., a rotor failing, a rotor getting stuck, etc.) is higher. Although the tiltrotor may have systems and/or techniques in place for recovery (e.g., compensating for a rotor being out by having the remaining rotors output more thrust, deploy a parachute, etc.), these systems and/or techniques take time (i.e., sufficient altitude) to work.

From position 602, the tiltrotor flies substantially forward and moves the tilt rotors from a hover position (e.g., where thrust is output substantially downward) to a cruise position. Once in the cruise position 604, the rotors rotate about a substantially longitudinal axis so that they output backward thrust.

Figure 6B:
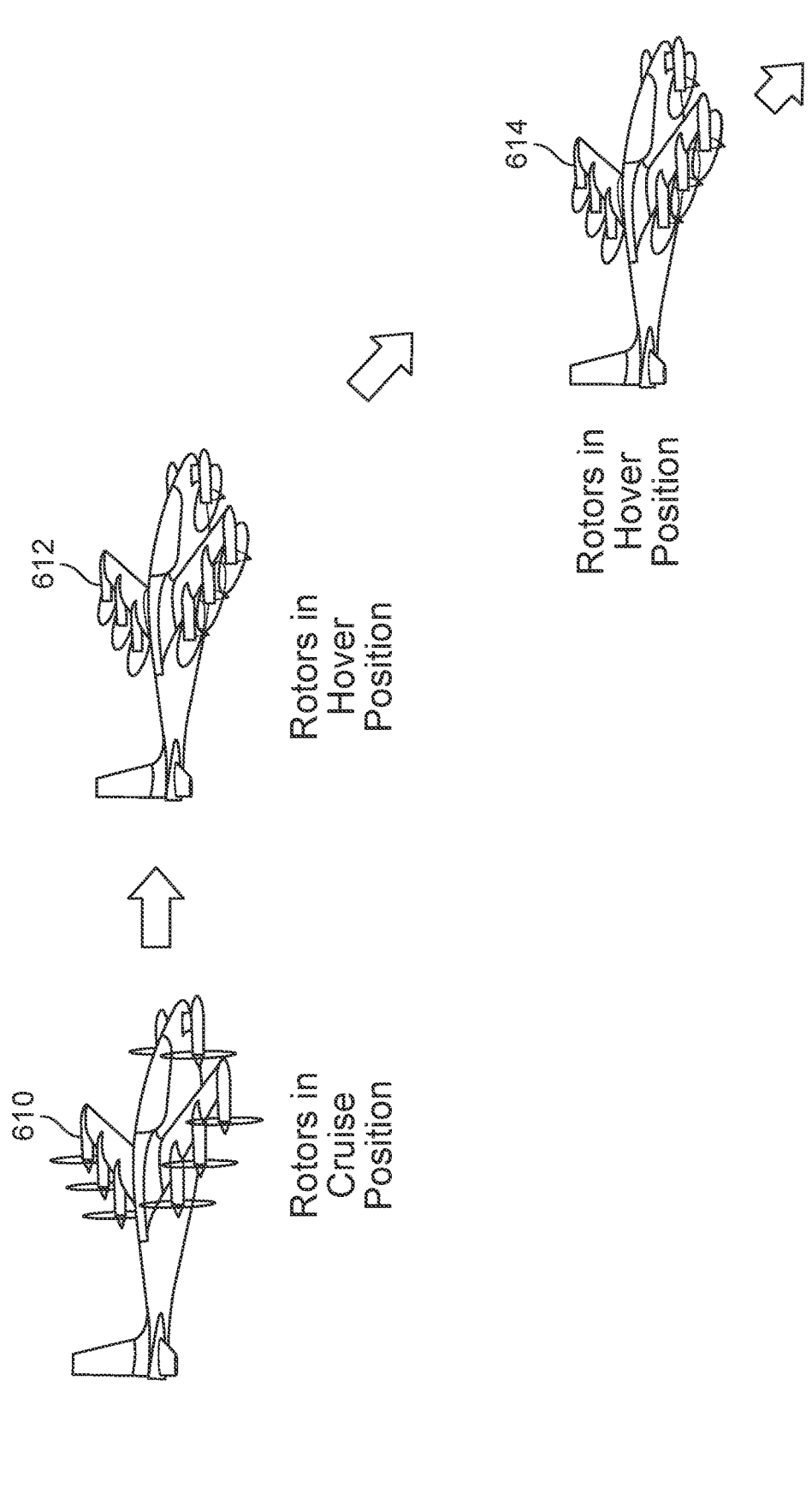
FIG. 6B is a diagram illustrating an embodiment of a landing tilt change from cruise position to hover position.

FIG. 6B is a diagram illustrating an embodiment of a landing tilt change from cruise position to hover position. For example, the exemplary tiltrotor may perform this transition before landing vertically. As with the previous transition, this transition is optional. For example, the exemplary tiltrotor can keep the tilt rotors in cruise position and perform a glider-like landing as opposed to a vertical landing if desired.

Tiltrotor 610 shows the rotors in a cruise position. While flying in a substantially forward direction, the tilt rotors are moved from the cruise position shown at 610 to the hover position shown at 612. With the tilt rotors in the hover position (612), the tiltrotor descends with some forward movement (at least in this example) so as to keep power use low(er) and retain better options in the case of a failure of a motor or other component (e.g., the tiltrotor can power up the rotors and pull out of the landing process or path) to position 614 until it finally lands on the ground.

Figure 7:
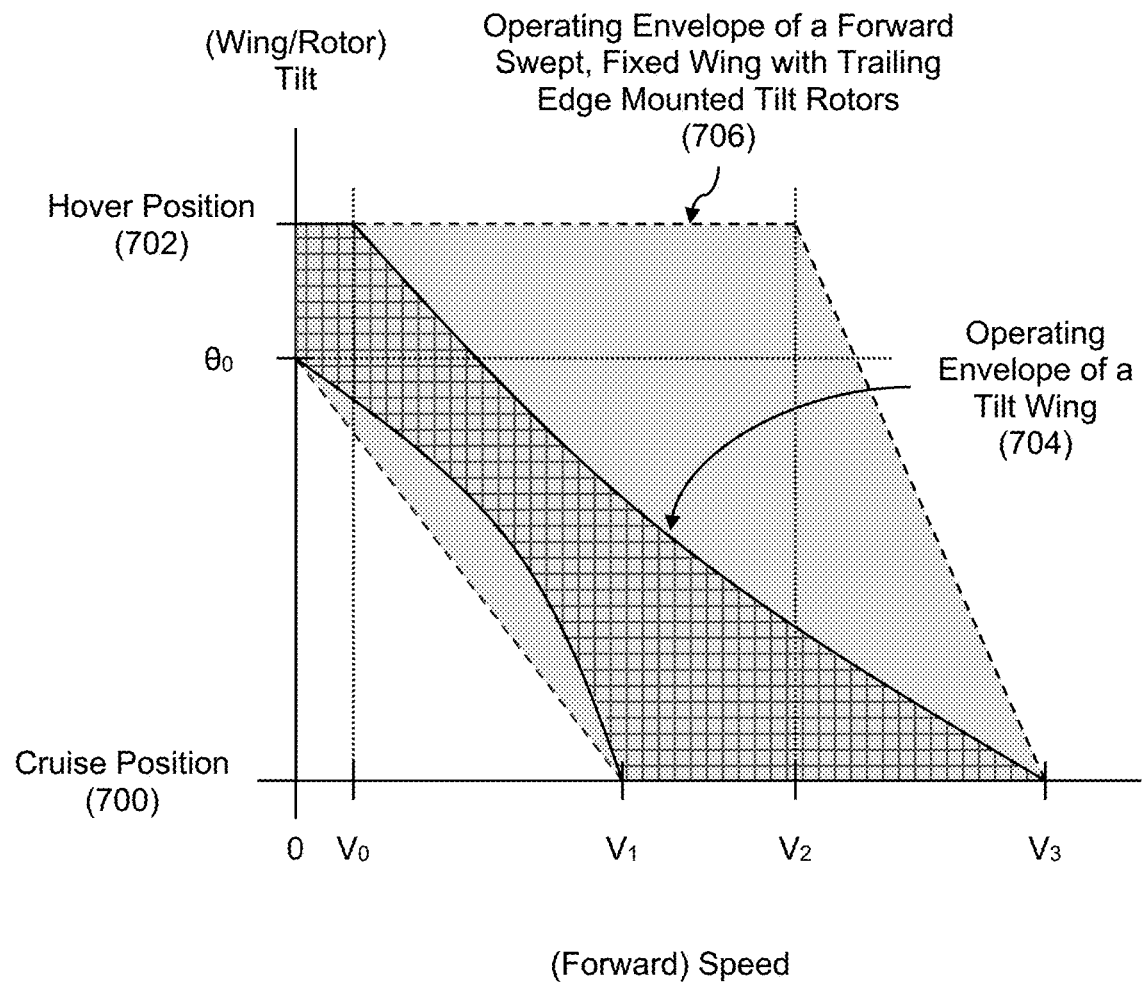
FIG. 7 is a diagram illustrating an embodiment of a velocity tilt diagram.

FIG. 7 is a diagram illustrating an embodiment of a velocity tilt diagram. In the diagram shown, the x-axis shows the forward speed of the aircraft and the y-axis shows the tilt (e.g., position or angle of the tilt wing or tilt rotors) which ranges from a (e.g., minimal) cruise position (700) to a (e.g., maximal) hover position (702).

The first operating envelope (704), shown with a solid border and filled with a grid pattern, is associated with a tilt wing aircraft. See, for example, tiltrotor 400 in FIG. 4 and tilt wing 302 and fixed rotor 300 in FIG. 3A. The second operating envelope (706), shown with a dashed border and gray fill, is associated with an (e.g., comparable) aircraft with a forward swept and fixed wing with trailing edge mounted tilt rotors. See, for example, the embodiments described above.

In the diagram shown here, the tilt rotor operating envelope (706) is a superset of the tilt wing operating envelope (704) which indicates that the former aircraft configuration is safer and/or more airworthy than the latter and is also able to fly both faster and slower at comparable tilt positions. With a fixed wing, the wing is already (and/or always) pointed in the direction of (forward) travel. When the tilt rotors are at or near the (e.g., maximal) hover position (702), the vehicle can fly pretty much all the way up to the stall speed (e.g., $V_2$) without having to tilt the motors up to cruise position. Note, for example, that the tilt rotor operating envelope (706) can stay at the (e.g., maximal) hover position (702) all the way up to $V_2$. This greatly increases the operating regime of the tilt rotor operating envelope (706) compared to the tilt wing operating envelope (704). Note for example, all of the gray area above the tilt wing operating envelope (704).

Another effect which can contribute to the expanded operating envelope for the tilt rotor configuration at or near hover position includes flow turning (see, e.g., FIG. 4). The flow turning over the main wing induces some extra lift. In some embodiments, this flow turning and its resulting lift are amplified or optimized by tilting the main wing rotors at a slight backward angle from directly down when in a normal hover (e.g., at minimal tilt position 700).

In contrast, a tilt wing presents a large frontal area when the tilt wing is tilted up in (e.g., maximal) hover position (702). As a result, tilt wings are unable to fly forward at any kind of decent speed until at or near the full (e.g., minimal) cruise position (700) or nearly so.

Returning briefly to FIGS. 1A and 1B, early prototypes of the tiltrotor vehicle used a battery system with a single type of battery cell for design simplicity. For example, Lithium battery cells tend to be either high discharge rate (i.e., capable of outputting high current levels) or high energy, but not both (e.g., because typically as discharge rate capacity increases, energy capacity decreases). For example, batteries and/or cells with an energy density less than or equal to 190 Wh/kg are usually able to support high current draws and are accordingly considered or classified as high discharge rate and those with an energy density greater than or equal to 235 Wh/kg are considered or classified as high energy. Early prototypes used battery cells that were a compromise between the two in order to use a single type of cell which reduces design complexity. Since the rest of the vehicle was more of a departure from existing vehicles, it was desirable to maintain design simplicity where possible in early prototypes.

With subsequent versions and/or prototypes of the vehicle, increasing the range of the vehicle is a desirable performance improvement. Hybrid power systems (e.g., comprising two or more different power systems which are used at various times or modes during a flight) are more complex than using a battery system with a single type of cell (e.g., because the vehicle with the hybrid power system would need to switch various power systems on and off in a safe manner during flight, as well as other design considerations), but the range increase makes the tradeoff worthwhile.

The following figures describe various embodiments of hybrid power systems which may be used in the tiltrotor vehicle described above. First, an embodiment of a hybrid power system with two types of batteries is described. Then, an embodiment of a hybrid power system with a battery and a combustion engine is described. It is noted that the hybrid power systems described herein may be suitable for use in other types of vehicles, not just the exemplary tiltrotor vehicle described herein.

Figure 8:
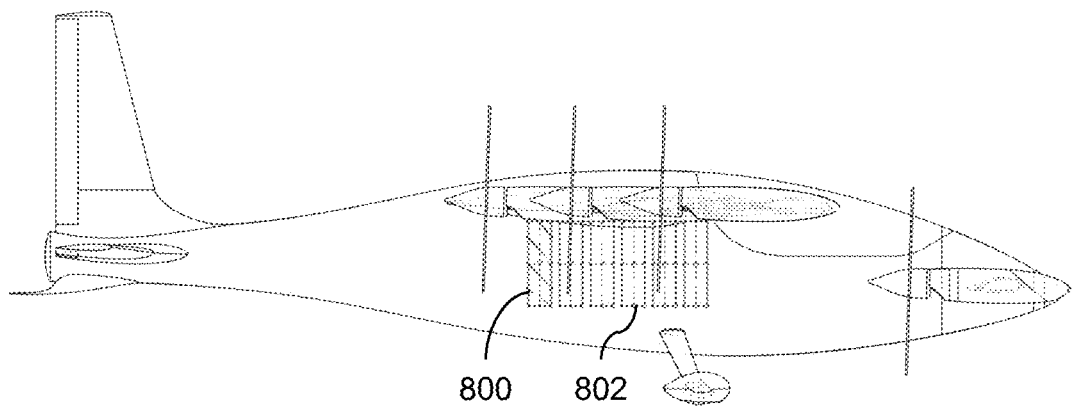
FIG. 8 is a diagram illustrating an embodiment of a vehicle with a hybrid power system comprising two battery sub-systems.

FIG. 8 is a diagram illustrating an embodiment of a vehicle with a hybrid power system comprising two battery sub-systems. In the example shown, the tiltrotor vehicle includes one high discharge rate battery (800) and five high energy batteries (802). In this example, the high discharge rate battery (800) has an energy density of ~180 Wh/kg and takes up ~15% of the total battery weight while the high energy batteries (802) has an energy density of ~270 Wh/kg. The high energy batteries are more limited in their discharge rate, but are suitable for the power needs of cruise flight.

For example, consider the flight sequence shown in FIG. 6A. A relatively high discharge rate is needed for the hover regime (600 in FIG. 6A) and transition regime (602 in FIG. 6A) since more thrust is required from the rotors during those modes of flight (e.g., since there is little or no lift force on the wing so that all or most of the lift comes from the rotors). In contrast, during cruise (604 in FIG. 6A), the power needed is much lower, approximately 30% of the power required during hover. To that end, during the vertical takeoff (i.e., hover mode 600 in FIG. 6A) and while the vehicle is transitioning from hovering mode to forward flight (602 in FIG. 6A), the high discharge rate battery (800) is used to supply power to the tilt rotors. In the forward flight or cruise regime (604 in FIG. 6A), the high energy batteries (802) are used to supply power.

A benefit to the exemplary hybrid power system shown here is that it increases the (e.g., cruise) range compared to an earlier, non-hybrid power system (e.g., with a single type of battery cell) initially used for early prototypes. For example, the initial battery system used a single type of cell with an energy density of ~200 Wh/kg, which is a compromise value. As a result of this comprise, more cells are needed to be able to draw the overall level of current required for the power-hungry hover and transitional phases of flight. The end result of this compromise strategy is that the (e.g., cruise) range is lower than that offered by the exemplary hybrid power systems. For example, the exemplary hybrid power system shown here may yield a cruise battery capacity and cruise range increase of ~15% over the earlier, non-hybrid power system.

As shown in this example, in some embodiments, a first power source (e.g., in a hybrid power system) includes a high discharge rate battery with an energy density less than or equal to 190 Wh/kg and a second power source (e.g., in the hybrid power system) includes a high energy battery with an energy density greater than or equal to 235 Wh/kg. In some embodiments, during the transitional mode, the power controller is configured to select the high discharge rate battery to power a rotor in the vehicle and to select the high energy battery to power the rotor. In some embodiments, the weight of the high discharge rate battery is less than or equal to 20% of a total battery weight.

One consideration when using a hybrid power system is deciding when to change the power sub-systems supplying power to the tilt rotors. In one example, after taking off vertically, a current sensor monitors bus current and when the aircraft is in cruise mode, as the current draw from the motors falls off and stabilizes, the power source is switched from high discharge (800) to the high energy (802) batteries. That is, the test for switching during the takeoff sequence may be based on which flight mode or state the vehicle is in (e.g., a flight computer or controller may have a flight state variable with values of HOVER_ST, TRANS_ST, or FF_ST) and whether or not an average current draw (e.g., within a moving window of time) is less than or equal to some threshold.

In some cases, the threshold or state which triggers a change in the power sub-systems used to power the tilt rotors is different for the takeoff sequence (e.g., the hovering, transition, and forward flight sequence) versus the landing sequence (e.g., the forward flight, transition, and hovering sequence). For example, a current sensor as described above can be used to determine when to switch from high discharge to high energy during takeoff. However, during landings, especially in the final approach phase, current draws can stay low as the vehicle is descending even though the rotors are tilted into hover mode. As the vehicle approaches the ground, power draw can increase suddenly, necessitating a power source switch very close to the ground and not leaving any room in case of a switch gear failure. In such cases, it may be desirable to switch power sources at the beginning of the detransition phase (e.g., with a flight state variable transitions from FF_ST to TRANS_ST) regardless of the current draw rather than wait till power needs increase close to the ground.

An important consideration in hybrid power systems for aircraft is how to safely switch between the different power sources. In one example, for safety, the switch is performed by using more than one electronically activated mechanical or semiconductor based switch, sized such that the system will work even if any one switch fails. Further, for safety, switches may be chosen such that they fail in the open circuit position for one source but closed for the other source, thereby preventing a situation where either both packs are simultaneously connected to the bus or neither pack is connected to the bus.

In some embodiments, a hybrid power system includes a battery and an internal combustion engine. The following figures describe various examples of this. As will be described in more detail below, in some embodiments there is/are one or more cruise-only (i.e., fixed) propellers that are used for forward flight mode (and possibly to some degree during the transition mode) but are not used for hover mode.

Figure 9:
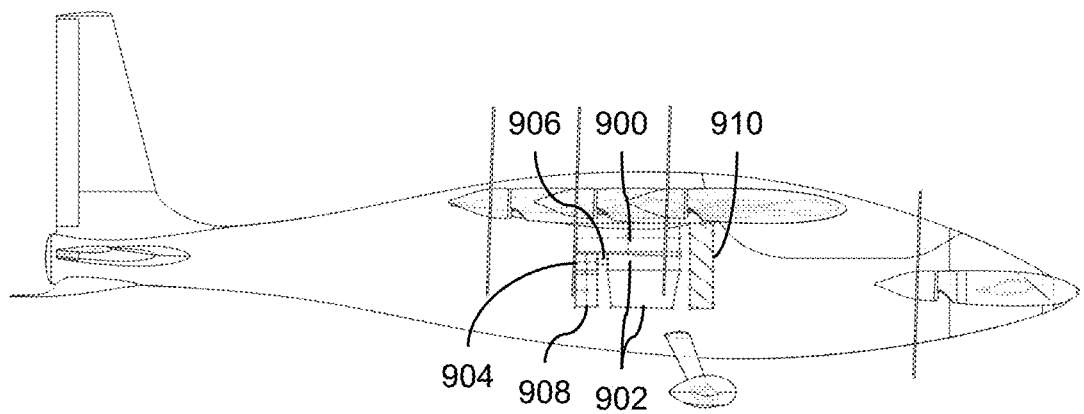
FIG. 9 is a diagram illustrating an embodiment of a vehicle with a hybrid power system comprising a battery sub-system and an internal combustion engine.

FIG. 9 is a diagram illustrating an embodiment of a vehicle with a hybrid power system comprising a battery sub-system and an internal combustion engine. In the example shown, during cruise mode, an internal combustion engine (e.g., including a fuel tank (900) and engine with gear-box (902)) drives a generator (904) via the engine-generator shaft (906) with power electronics (908) controlling the generation of electrical power by the internal combustion engine for the electric tilt rotors. During hover mode, the electrical power supplied by the internal combustion engine is supplemented by the batteries (910).

In some embodiments, the generator (904) is used to (e.g., slowly) charge the batteries (910) during the cruise phase. For example, since the batteries are only used during the hover mode (e.g., for takeoff and landing), the batteries may be charged during cruise mode since they are not discharging during that time. This may increase the vehicle's available hover time during landing (which may be attractive if a landing zone is occupied and the vehicle needs to hover while the landing zone is cleared) and/or permit a smaller-capacity (and therefore lighter) battery to be used.

For the purposes of comparison, suppose that an early prototype of the vehicle is equipped with 100 kg of battery packs (e.g., a non-hybrid battery system with a single type of cell). For the example hybrid system shown here, suppose that the high discharge rate batteries from FIG. 8 are used for the batteries (910). If so, the battery portion (910) in this hybrid example would weight ~16 kg. The internal combustion engine portion of the hybrid (e.g., including fuel tank (900) and engine with gear-box (902)) takes up ~38 kg of weight along with its fluids and support systems. The electric generator (904) and power electronics (908) take up ~16 kg. This leaves ~30 kg for fuel, which translates to a 50% increase in cruise range compared to the comparison, non-hybrid battery configuration. Although there is an increase in complexity, safety challenges (e.g., due to flammable liquid), noise and vibration issues, the increased range may make this tradeoff worthwhile for longer-range applications. Also, unlike the hybrid example shown in FIG. 8, one of the power sub-systems (the internal combustion engine) is always on in this embodiment. This may be attractive for safety reasons since there is no chance of a first power sub-system switching off and a second power sub-system failing to switch on.

As shown in this example, in some embodiments, the first power source (e.g., in a hybrid system) includes an internal combustion engine, the second power source includes a (e.g., high discharge rate) battery; during the transitional mode, the power controller is configured to select the internal combustion engine to power the rotor and to de-select the battery so that the battery does not power the rotor; during a hover mode, the power controller is configured to select the internal combustion engine to power the rotor and to select the battery to power the rotor. In some embodiments, the internal combustion engine is used to recharge the battery at least some of the time when the battery is de-selected and not powering the rotor.

Figure 10:
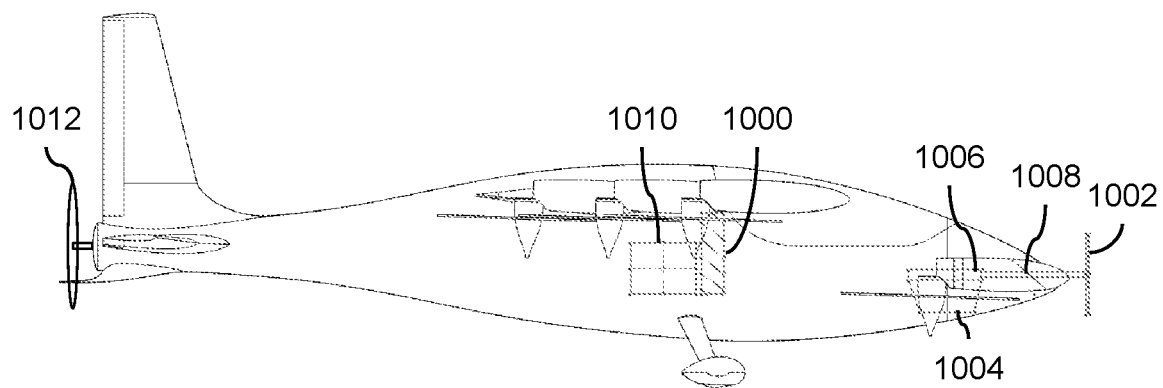
FIG. 10 is a diagram illustrating an embodiment of a vehicle with a cruise-only propeller and hover and transition-only tiltrotors and a hybrid power system comprising a battery sub-system and an internal combustion engine.

FIG. 10 is a diagram illustrating an embodiment of a vehicle with a cruise-only propeller and hover and transition-only tiltrotors and a hybrid power system comprising a battery sub-system and an internal combustion engine. In the example shown, a battery sub-system (1000) drives the (electric) tilt rotors (shown here in the tilted down position for hover) during hover and transition. In some embodiments, the battery sub-system (1000) includes multiple types of cells (e.g., a high energy battery as well as a high discharge rate battery) which are switched on and off during various flight modes as described above (see, e.g., FIG. 8).

The hybrid power system further includes an internal combustion engine which drives a cruise-only propeller (1002). In this example, the cruise-only propeller is mounted to the nose of the aircraft but such propellers may be located in a variety of places (e.g., a pusher propeller or rotor (1012) on the tail cone). During cruise (i.e., forward flight) mode, the engine (1004) turns the gearbox (1006) which in turn turns the cruise-only propeller (1002) via the propeller shaft (1008). Fuel is stored in the fuel tank (1010).

For the purposes of comparison, suppose that an early prototype of the vehicle is equipped with 100 kg of battery packs (e.g., a non-hybrid battery system with a single type of cell). In this comparison, suppose that the battery portion (1000) in this example uses high discharge batteries and that the battery portion weights ~16 kg of weight in this hybrid example. The internal combustion engine takes up ~45 kg of weight along with its fluids and support systems as well as a gearbox and the additional propeller (1002). This leaves ~39 kg for fuel, which translates to an almost 100% increase in cruise range compared to the comparison configuration. In some long-range applications, the range increase offered makes the tradeoff in any complexity, safety issues (e.g., related to having a flammable liquid onboard), noise and vibration, and so on worthwhile.

As shown in this example, in some embodiments, a first power source (e.g., in a hybrid power system) includes an internal combustion engine and the second power source includes a battery where the rotor included in the vehicle includes a tilt rotor and the vehicle further includes a cruise-only rotor. A power controller is configured to: during a forward flight mode, select the internal combustion engine to power the cruise-only rotor and during a hover mode and a transitional mode, de-select the internal combustion engine so that the internal combustion engine does not power the cruise-only rotor.

In this example, the tilting propellers are used for hover and transition and are turned off during the cruise portion of the flight. In some embodiments, to reduce drag, the tilting propellers are foldable so that during cruise mode the propeller blades can be folded (e.g., back) to reduce drag during cruise.

In some embodiments, the cruise-only rotor includes a cruise-only, pusher rotor that is located behind a tail in the vehicle (e.g., so that the wake produced by the cruise-only rotor does not interfere with the airflow over the canard or main wing). In some embodiments, the second power source includes a high discharge rate battery with an energy density less than or equal to 190 Wh/kg and a high energy battery with an energy density greater than or equal to 235 Wh/kg (i.e., the battery sub-system is itself a hybrid system, such as the example shown in FIG. 8).

As described above, hybrid power systems may be useful in increasing range. in some embodiments, batteries provide additional thrust needed during a hover and/or transition mode, but an internal combustion engine and generator provide the lower power needed for cruise flight. This would increase range substantially for a given vehicle weight since liquid fuels are far more energy dense than batteries.

In another embodiment, the hybrid power system uses two electric (i.e., battery) systems, one with high power output cells for hover and/or transition mode and the other using high energy dense cells (e.g., which typically have lower current output capabilities) providing cruise power, thereby extending the range compared to a single electric system (i.e., with a single, compromise type of cell).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A hybrid power system, comprising:
a first power source that includes a high discharge rate battery;
a second power source that includes a high energy battery; and
a power controller, wherein:
the hybrid power system is included in a vehicle that flies in a transitional mode between a hovering mode and a forward flight mode; and
the power controller selects one or more of the first power source and the second power source to power a rotor included in the vehicle during the transitional mode, including by:
during a takeoff, the power controller determines when to switch from the first power source that includes the high discharge rate battery to the second power source that includes the high energy battery based at least in part on a measured current; and
during a landing, the power controller determines when to switch from the second power source that includes the high energy battery to the first power source that includes the high discharge rate battery based at least in part on a transition between flight state variables and independent of the measured current.

2. The hybrid power system recited in claim 1, wherein the vehicle includes a vertical takeoff and landing (VTOL) vehicle that further includes:
a forward swept and tapered wing having a trailing edge; and
a tilt rotor that is attached to the trailing edge of the forward swept and tapered wing.

3. The hybrid power system recited in claim 1, wherein:
the high discharge rate battery included in the first power source has an energy density less than or equal to 190 Wh/kg;
the high energy battery included in the second power source has an energy density greater than or equal to 235 Wh/kg; and
during the transitional mode, the power controller selects both the high discharge rate battery and the high energy battery to power the rotor.

4. The hybrid power system recited in claim 1, wherein:
the high discharge rate battery included in the first power source has (1) a weight and (2) an energy density less than or equal to 190 Wh/kg;
the high energy battery included in the second power source has an energy density greater than or equal to 235 Wh/kg; and
the weight of the high discharge rate battery is less than or equal to 20% of a total battery weight.

5. The hybrid power system recited in claim 1, wherein:
the hybrid power system further includes an internal combustion engine;
during the transitional mode, the power controller selects the internal combustion engine to power the rotor and de-selects the high discharge rate battery so that the high discharge rate battery does not power the rotor; and
during the hover mode, the power controller selects the internal combustion engine to power the rotor and selects the high discharge rate battery to power the rotor.

6. The hybrid power system recited in claim 1, wherein:
the hybrid power system further includes an internal combustion engine;
during the transitional mode, the power controller selects the internal combustion engine to power the rotor and de-selects the high discharge rate battery so that the high discharge rate battery does not power the rotor;
during the hover mode, the power controller selects the internal combustion engine to power the rotor and selects the high discharge rate battery to power the rotor; and
the internal combustion engine is used to recharge the high discharge rate battery at least some of the time when the high discharge rate battery is de-selected and not powering the rotor.

7. The hybrid power system recited in claim 1, wherein:
the hybrid power system further includes an internal combustion engine;
during the transitional mode, the power controller selects the internal combustion engine to power the rotor and de-selects the high discharge rate battery so that the high discharge rate battery does not power the rotor;

during the hover mode, the power controller selects the internal combustion engine to power the rotor and selects the high discharge rate battery to power the rotor; and the high discharge rate battery has an energy density less than or equal to 190 Wh/kg.

8. The hybrid power system recited in claim 1, wherein:
the hybrid power system further includes an internal combustion engine;
the rotor included in the vehicle includes a tilt rotor;
the vehicle further includes a cruise-only rotor;
during the forward flight mode, the power controller selects the internal combustion engine to power the cruise-only rotor; and
during hover mode and the transitional mode, the power controller de-selects the internal combustion engine so that the internal combustion engine does not power the cruise-only rotor.

9. The hybrid power system recited in claim 1, wherein:
the hybrid power system further includes an internal combustion engine;
the rotor included in the vehicle includes a tilt rotor;
the vehicle further includes a cruise-only, pusher rotor that is located behind a tail in the vehicle;
during the forward flight mode, the power controller selects the internal combustion engine to power the cruise-only rotor; and
during the hover mode and the transitional mode, the power controller de-selects the internal combustion engine so that the internal combustion engine does not power the cruise-only rotor.

10. The hybrid power system recited in claim 1, wherein:
the hybrid power system further includes an internal combustion engine;
the high discharge rate battery has an energy density less than or equal to 190 Wh/kg;
the high energy battery has an energy density greater than or equal to 235 Wh/kg;
the rotor included in the vehicle includes a tilt rotor;
the vehicle further includes a cruise-only rotor; and
during the forward flight mode, the power controller selects the internal combustion engine to power the cruise-only rotor; and
during the hover mode and the transitional mode, the power controller de-selects the internal combustion engine so that the internal combustion engine does not power the cruise-only rotor.

11. The hybrid power system recited in claim 1, wherein:
the hybrid power system further includes an internal combustion engine;
the rotor included in the vehicle includes a tilt rotor;
the vehicle further includes a cruise-only rotor;
during the forward flight mode, the power controller selects the internal combustion engine to power the cruise-only rotor, wherein none of the high discharge rate battery, the high energy battery, nor the internal combustion engine powers the tilt rotor during the forward flight mode; and
during the hover mode and the transitional mode, the power controller de-selects the internal combustion engine so that the internal combustion engine does not power the cruise-only rotor.

12. A method for using a hybrid power system that includes a first power source, a second power source, and a power controller, comprising:
providing the first power source, the second power source, and the power controller, wherein the hybrid power system is included in a vehicle that flies in a transitional mode between a hovering mode and a forward flight mode; and
using the power controller to select one or more of the first power source and the second power source to power a rotor included in the vehicle during the transitional mode, including by;
during a takeoff, the power controller determines when to switch from the first power source that includes the high discharge rate battery to the second power source that includes the high energy battery based at least in part on a measured current; and
during a landing, the power controller determines when to switch from the second power source that includes the high energy battery to the first power source that includes the high discharge rate battery based at least in part on a transition between flight state variables and independent of the measured current.

13. The method for using the hybrid power system that includes the first power source, the second power source, and the power controller recited in claim 12, wherein the vehicle includes a vertical takeoff and landing (VTOL) vehicle that further includes:
a forward swept and tapered wing having a trailing edge; and
a tilt rotor that is attached to the trailing edge of the forward swept and tapered wing.

14. The method for using the hybrid power system that includes the first power source, the second power source, and the power controller recited in claim 12, wherein:
the high discharge rate battery included in the first power source has an energy density less than or equal to 190 Wh/kg;
the high energy battery included in the second power source has an energy density greater than or equal to 235 Wh/kg; and
the method further includes: during the transitional mode, using the power controller to select the high discharge rate battery to power the rotor and to select the high energy battery to power the rotor.

15. The method for using the hybrid power system that includes the first power source, the second power source, and the power controller recited in claim 12, wherein:
the high discharge rate battery included in the first power source has (1) a weight and an energy density less than or equal to 190 Wh/kg;
the high energy battery included in the second power source has an energy density greater than or equal to 235 Wh/kg; and
the weight of the high discharge rate battery is less than or equal to 20% of a total battery weight.

16. The method for using the hybrid power system that includes the first power source, the second power source, and the power controller recited in claim 12, wherein:
the hybrid power system further includes an internal combustion engine; and
the method further includes:
during the transitional mode, using the power controller to select the internal combustion engine to power the rotor and to de-select the high discharge rate battery so that the high discharge rate battery does not power the rotor; and
during the hover mode, using the power controller to select the internal combustion engine to power the rotor and to select the high discharge rate battery to power the rotor.

17. The method for using the hybrid power system that includes the first power source, the second power source, and the power controller recited in claim 12, wherein:
    the hybrid power system further includes an internal combustion engine; and
    the method further includes:
        during the transitional mode, using the power controller to select the internal combustion engine to power the rotor and to de-select the high discharge rate battery so that the high discharge rate battery does not power the rotor;
        during the hover mode, using the power controller to select the internal combustion engine to power the rotor and to select the high discharge rate battery to power the rotor; and
        using the internal combustion engine to recharge the high discharge rate battery at least some of the time when the high discharge rate battery is de-selected and not powering the rotor.

18. The method for using the hybrid power system that includes the first power source, the second power source, and the power controller recited in claim 12, wherein:
    the hybrid power system further includes an internal combustion engine;
    the method further includes:
        during the transitional mode, using the power controller to select the internal combustion engine to power the rotor and to de-select the high discharge rate battery so that the high discharge rate battery does not power the rotor; and
        during the hover mode, using the power controller to select the internal combustion engine to power the rotor and to select the high discharge rate battery to power the rotor; and the high discharge rate battery has an energy density less than or equal to 190 Wh/kg.

19. The method for using the hybrid power system that includes the first power source, the second power source, and the power controller recited in claim 12, wherein:
    the hybrid power system further includes an internal combustion engine;
    the rotor included in the vehicle includes a tilt rotor;
    the vehicle further includes a cruise-only rotor; and
    the method further includes:
        during the forward flight mode, using the power controller to select the internal combustion engine to power the cruise-only rotor; and
        during hover mode and the transitional mode, using the power controller to de-select the internal combustion engine so that the internal combustion engine does not power the cruise-only rotor.

20. The method for using the hybrid power system that includes the first power source, the second power source, and the power controller recited in claim 12, wherein:
    the hybrid power system further includes an internal combustion engine;
    the rotor included in the vehicle includes a tilt rotor;
    the vehicle further includes a cruise-only, pusher rotor that is located behind a tail in the vehicle; and
    the method further includes:
        during the forward flight mode, using the power controller to select the internal combustion engine to power the cruise-only rotor; and
        during the hover mode and the transitional mode, using the power controller to de-select the internal combustion engine so that the internal combustion engine does not power the cruise-only rotor.

\* \* \* \* \*